(12) United States Patent
Song et al.

(10) Patent No.: US 10,894,388 B2
(45) Date of Patent: Jan. 19, 2021

(54) PROTECTIVE STEEL PLATE WITH EXCELLENT COLD-BEND PROCESSING PERFORMANCE AND METHOD FOR MANUFACTURING SAME

(71) Applicant: BAOSHAN IRON & STEEL CO., LTD., Shanghai (CN)

(72) Inventors: Fengming Song, Shanghai (CN); Xiaoping Hu, Shanghai (CN); Donghui Wen, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 0 days.

(21) Appl. No.: 16/096,117

(22) PCT Filed: Apr. 26, 2017

(86) PCT No.: PCT/CN2017/081952
§ 371 (c)(1),
(2) Date: Oct. 24, 2018

(87) PCT Pub. No.: WO2017/186112
PCT Pub. Date: Nov. 2, 2017

(65) Prior Publication Data
US 2019/0134947 A1    May 9, 2019

(30) Foreign Application Priority Data
Apr. 26, 2016 (CN) .......................... 2016 1 0265666

(51) Int. Cl.
B32B 15/00 (2006.01)
B32B 15/01 (2006.01)
(Continued)

(52) U.S. Cl.
CPC .............. *B32B 15/011* (2013.01); *B32B 7/08* (2013.01); *B32B 15/01* (2013.01); *B32B 15/04* (2013.01);
(Continued)

(58) Field of Classification Search
None
See application file for complete search history.

(56) References Cited

U.S. PATENT DOCUMENTS 3,559,276 A     2/1971  Anderson
2002/0094406 A1  7/2002  Cohen
(Continued)

FOREIGN PATENT DOCUMENTS

CN     101486043          7/2009
CN     105088090 A  * 11/2015   .............. C22C 38/44
(Continued)

OTHER PUBLICATIONS

P. Zhang et al., "General relationship between strength and hardness", 2011, Materials Science and Engineering A, vol. 529, p. 62-73. (Year: 2011).*
(Continued)

*Primary Examiner* — Seth Dumbris
*Assistant Examiner* — Kim S. Horger
(74) *Attorney, Agent, or Firm* — Thomas Horstemeyer, LLP (57) ABSTRACT

There is disclosed in the disclosure a protective steel plate with excellent cold roll formability, comprising: three soft steel layers (1, 4, 5) and two hard steel layers (2, 3), wherein the three soft steel layers (1, 4, 5) and the two hard steel layers (2, 3) are positioned alternately, and face layers of the protective steel plate are soft steel layers (1, 4, 5), wherein the hard steel layers (2, 3) and the soft steel layers (1, 4, 5) are atomically bonded by rolling cladding; wherein the soft
(Continued)

steel layers (1, 4, 5) comprise chemical elements in percentage by mass of: C: 0.001-0.01%, 0<Si≤0.005%, Mn: 0.05-0.15%, 0<Al≤0.005%, Ti: 0.01-0.10%, with a balance of Fe and other unavoidable impurities.

14 Claims, 4 Drawing Sheets

(51) Int. Cl.
| | | |
|---|---|---|
| C22C 38/02 | (2006.01) | |
| C22C 38/04 | (2006.01) | |
| B32B 15/18 | (2006.01) | |
| B32B 37/10 | (2006.01) | |
| B32B 7/08 | (2019.01) | |
| C21D 1/18 | (2006.01) | |
| C22C 38/14 | (2006.01) | |
| B32B 15/04 | (2006.01) | |
| C22C 38/08 | (2006.01) | |
| C22C 38/12 | (2006.01) | |
| C21D 6/00 | (2006.01) | |
| C21D 8/02 | (2006.01) | |
| C21D 9/46 | (2006.01) | |
| C22C 38/00 | (2006.01) | |
| C22C 38/06 | (2006.01) | |
| C22C 38/44 | (2006.01) | |
| C22C 38/50 | (2006.01) | |
| C22C 38/54 | (2006.01) | |

(52) U.S. Cl.
CPC .............. *B32B 15/18* (2013.01); *B32B 37/10* (2013.01); *C21D 1/18* (2013.01); *C21D 6/004* (2013.01); *C21D 6/005* (2013.01); *C21D 6/008* (2013.01); *C21D 8/0205* (2013.01); *C21D 8/0247* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/44* (2013.01); *C22C 38/50* (2013.01); *C22C 38/54* (2013.01); *B32B 2250/42* (2013.01); *B32B 2571/02* (2013.01); *C21D 2211/005* (2013.01); *C21D 2211/008* (2013.01)

(56) References Cited

U.S. PATENT DOCUMENTS

| | | | |
|---|---|---|---|
| 2010/0003540 A1* | 1/2010 | Koseki | B21B 1/38 428/638 |
| 2010/0323216 A1* | 12/2010 | Becker | B32B 15/011 428/624 |
| 2015/0030879 A1* | 1/2015 | Kosaka | C22C 38/001 428/659 |
| 2017/0297304 A1* | 10/2017 | Becker | C22C 38/32 |

FOREIGN PATENT DOCUMENTS

| | | | |
|---|---|---|---|
| CN | 105499296 | 4/2016 | |
| DE | 1954641 | 9/1971 | |
| DE | 69716518 | 7/2003 | |
| EP | 0366646 | 5/1990 | |
| EP | 0816524 | 1/1998 | |
| JP | H0663699 | 3/1994 | |
| JP | H06256844 | 9/1994 | |
| JP | H1060544 | 3/1998 | |
| JP | H11343537 | 12/1999 | |
| JP | H11343537 A * | 12/1999 | |
| JP | 2002256390 | 9/2002 | |
| JP | 2003239037 | 8/2003 | |
| JP | 2009233708 | 10/2009 | |
| JP | 2010535292 | 11/2010 | |
| JP | 2017512247 | 5/2017 | |
| JP | 2017535668 | 11/2017 | |
| JP | 2018530668 | 10/2018 | |
| JP | 2019505687 | 2/2019 | |
| RU | 2427781 | 8/2011 | |
| WO | WO-2014154106 A1 * | 10/2014 | C22C 38/001 |
| WO | WO-2016050417 A1 * | 4/2016 | C22C 38/02 |

OTHER PUBLICATIONS

T. Inoue et al., "Shape effect of ultrafine-grained structure on static fracture toughness in low-alloy steel", 2012, Science and Technology of Advanced Materials, vol. 13, 035005 (10 pages). (Year: 2012).*

International Search Report & Written Opinion for PCT/CN2017/081952 dated Aug. 1, 2017.

Office Action dated Oct. 29, 2019 for Japanese Patent Application No. 2018-555895.

Office Action dated Jan. 30, 2020 for German Patent Application No. 112017002175 with English translation.

* cited by examiner

PROTECTIVE STEEL PLATE WITH EXCELLENT COLD-BEND PROCESSING PERFORMANCE AND METHOD FOR MANUFACTURING SAME

CROSS-REFERENCE TO RELATED APPLICATIONS

This application is a 371 U.S. National Phase of PCT International Application No. PCT/CN2017/081952 filed on Apr. 26, 2017, which claims benefit and priority to Chinese patent application no. 201610265666.9, filed on Apr. 26, 2016. Both of the above-referenced applications are incorporated by reference herein in their entireties.

TECHNICAL FIELD

The present disclosure relates to a steel plate and a method for manufacturing the same, particularly to a protective steel plate and a method for manufacturing the same.

BACKGROUND ART

Protective requirements are imposed on key parts of protective equipment or devices such as amour cash carriers. Particularly, a steel plate needs to endure impact from a high speed impacting object in a certain distance without cracking or penetration. Existing protective materials include individual high-strength protective steel plates, ceramic composites or high molecular fibrous materials. A protective steel plate relies on its high elastic deformation to absorb the impact energy of an impacting object. If its toughness is insufficient (particularly for an ultrahigh-strength steel plate), it's very prone to fragmentation, thereby losing its protective function. A ceramic material is extremely hard, but its toughness is rather poor. When contacting an impacting object, the ceramic material shatters into small fragments, and thus the impact energy is absorbed. The ceramic material generally needs to be used in combination with a high molecular fibrous material which has good toughness. When impacted by an impacting object, the fibrous material absorbs the impact load with elastic deformation. Fibrous materials are mostly used for manufacture of protective vests.

Theoretically, if a steel plate is thick enough, it can be used alone to meet protective requirements under different conditions. However, an excessive thickness increases the weight of the steel plate, sacrifices its mobility and increases energy consumption. Nowadays, protective steel plates are on the way toward higher strength and less thickness.

Chinese patent application No. CN1814845A, published on Jan. 2, 2008 and titled "1000 MPa-GRADE HIGH-STRENGTH HOT-ROLLED BULLET-PROOF STEEL PLATE AND METHOD FOR MANUFACTURING SAME", discloses a 1000 MPa-grade high-strength hot-rolled bullet-proof steel plate comprising, in percentage by weight: C 0.17-0.21%, Si 1.5-2.2%, Mn 1.5-2.0%, P≤0.035%, S≤0.010%, Al 0.015-0.060%, N≤0.0060%, Nb 0.010-0.050%, optional Ti 0.010-0.060%, Ca≤0.0050%, with a balance of Fe and unavoidable impurities. Chinese patent application No. CN103993235A, published on Aug. 20, 2014 and titled "METHOD FOR MANUFACTURING HIGH-STRENGTH HOT-ROLLED BULLET-PROOF STEEL PLATE", discloses a method for manufacturing a high-strength hot-rolled bullet-proof steel plate. The bullet-proof steel plate comprises C: 0.08-0.12%, Si: 0.7-1.3%, Mn: 1.30-1.8%, Al: 0.01-0.06%, P≤0.02%, S≤0.004%, N≤0.004%, O≤0.015%, Gr: 0.3-1.0%, Ti+Nb≤0.2%, B: 0.0015-0.0025%, with a balance of Fe and unavoidable impurities. The protective steel plates disclosed by these two technical solutions both have a yield strength of 1000 MPa, and can hardly meet current requirements of thinning and protection.

Chinese patent application No. CN102181795A, published on Sep. 14, 2011 and titled "ULTRAHIGH-STRENGTH BULLET-PROOF STEEL PLATE AND METHOD FOR MANUFACTURING SAME", discloses an ultrahigh-strength bullet-proof steel plate and a process for manufacturing and forming the same. The steel plate has a chemical composition in percentage by weight of C 0.30-0.5, Si 0.40-0.60, Mn 1.50-1.80, P≤0.025, S≤0.01, Cr+Ni+Mo≤2.5, Nb+V+Ti+B≤0.20, with a balance of Fe. The bullet-proof steel plate in this technical solution has a C content of 0.30-0.50, and a tensile strength of about 2000 MPa. No toughness indicator is mentioned therein, but its hardness value is even higher than 600 HB. This unduly high hardness brings about a decreased toughness to the steel plate which is extremely prone to fragmentation when impacted by an impacting object.

With the proviso that the protective strength of a steel plate is guaranteed, in order to reduce the thickness of the steel plate and improve its plasticity, there is an urgent industrial need for a protective steel plate having excellent cold roll formability to promote utilization of the protective steel plate.

SUMMARY

One of the objects of the present disclosure is to provide a protective steel plate with excellent cold roll formability, which involves cladding by rolling, thereby achieving inter-atomic bonding, such that various layers of the laminate are well bonded to each other. The protective steel plate comprises three soft steel layers and two hard steel layers, which layers act to change the advancing direction of an impacting object. The soft steel layers positioned as face layers have superior plasticity which ensures that they will not crack when deformed by elongation. The hard steel layers shatter into small fragments when impacted by an impacting object, and the impact energy is thus consumed. Meanwhile, the soft steel layer positioned in the core changes the moving direction of the impacting object, and impedes the advancement of the impacting object, so as to fulfill better protective effect.

In order to realize the above object, the disclosure proposes a protective steel plate with excellent cold roll formability, comprising: three soft steel layers and two hard steel layers, wherein the three soft steel layers and the two hard steel layers are positioned alternately, and face layers of the protective steel plate are soft steel layers, wherein the hard steel layers and the soft steel layers are atomically bonded by rolling cladding; Wherein the soft steel layers comprise chemical elements in percentage by mass of:

C: 0.001-0.01%, 0<Si≤0.005%, Mn: 0.05-0.15%, 0<Al≤0.005%, Ti: 0.01-0.10%, with a balance of Fe and unavoidable impurities.

In the soft steel layers of the protective steel plate with excellent cold roll formability according to the disclosure, the unavoidable impurities are mainly P, S, N elements, wherein it may be controlled that P≤0.01%, S≤0.006%, N≤0.005%.

The soft steel layers of the protective steel plate with excellent cold roll formability according to the disclosure should have good plastic deformability and good capacity in absorbing kinetic energy. Hence, the soft steel layers need an extremely low yield strength. In order to effectively lower the yield strength and increase an elongation rate, addition of alloy elements should be minimized, and strengthening factors should be reduced. The yield strength of a steel plate is increased generally by solid solution strengthening, precipitation strengthening, dislocation strengthening and grain boundary strengthening. The soft steel layer positioned in the core and the soft steel layers at the faces are designed to have the same composition, thereby decreasing production difficulty while increasing production efficiency.

The various chemical elements in the soft steel layers according to the disclosure are designed in accordance with the following principles:

C may increase the yield strength and decrease the elongation rate by solid solution strengthening. The C content should be minimized in light of the steel making process in practice. Therefore, the C content in the soft steel layers of the protective steel plate with excellent cold roll formability according to the disclosure is controlled at 0.001-0.01%.

Si is a deoxygenating element, also a solid solution strengthening element, which increases the yield strength and decreases the elongation rate. Therefore, the amount of Si to be added should be minimized. Hence, the Si content in the soft steel layers of the protective steel plate with excellent cold roll formability according to the disclosure does not exceed 0.005%.

Mn is also a common strengthening element in steel, which increases the yield strength by solid solution strengthening, and decreases the elongation rate. Hence, the Mn content in the soft steel layers of the protective steel plate with excellent cold roll formability according to the disclosure is controlled at 0.05-0.15%.

Al is an element necessary for deoxygenation. However, it may also increase the steel strength. Hence, the Al content in the soft steel layers of the protective steel plate with excellent cold roll formability according to the disclosure is controlled at 0.005% or less.

Ti is used to immobilize C and N atoms to reduce their impedance against dislocation motion. Ti in steel can form $TiN \rightarrow Ti_4C_2S_2 \rightarrow TiS$ and TiC in order, and thus eliminates free C and N atoms in the steel, thereby decreasing the yield strength. At the same time, TiC and TiN grains, among others, are coarsened and thus lose their grain boundary pinning effect, thereby increasing the grain size and decreasing the grain boundary strengthening effect. However, excessive Ti will reduce the elongation rate of the steel plate. Hence, the Ti content in the soft steel layers of the protective steel plate with excellent cold roll formability according to the disclosure is controlled at 0.01-0.10%.

Further, the matrix structure of the soft steel layers of the protective steel plate with excellent cold roll formability is equiaxed ferrite.

Still further, the equiaxed ferrite of the protective steel plate with excellent cold roll formability has a grain size of 30-120 μm.

Further, the soft steel layers of the protective steel plate with excellent cold roll formability have a yield strength of 80-180 MPa, and the soft layers have an elongation rate of greater than 40% and a hardness value of less than 110 Hv.

In this technical solution, owing to the design of extremely low contents of C—Si—Mn components and the use of Ti to immobilize C, N interstitial atoms to eliminate the solid solution strengthening effect of C, N atoms, while providing a relatively large grain size due to coarsening of TiN, TiC particles, the matrix structure of the soft steel layers of the protective steel plate with excellent cold roll formability is equiaxed ferrite having a grain size of 30-120 μm even in a quenched state, and the hardness value of the soft steel layers does not exceed 110 Hv even under quenching conditions. Therefore, the soft steel layers have good plasticity.

Still further, the soft steel layer positioned in the core of the protective steel plate with excellent cold roll formability has a hardness value of less than 90 Hv, and the soft steel layers positioned at the faces have a hardness value of less than 110 Hv.

In this technical solution, when the protective steel plate is cold roll formed, the soft steel layers positioned at the faces furnish sufficient deformation due to the good plasticity, and thus act to prevent internal cracking when the steel plate is bent. The soft steel layer positioned in the core has good capacity of absorbing kinetic energy, such that when the hard steel layers deform, crack or even break away due to impact from an impacting object, the deformation energy, the crack forming and propagation energy, the interlayer binding energy released when the hard steel layers break away from the soft steel layer positioned in the core, and the kinetic energy of leaving fragments are fully absorbed, thereby consuming a part of the kinetic energy of the impacting object. Preferably, the hardness of the soft steel layer positioned in the core is slightly lower than the hardness value of the soft steel layers positioned at the faces.

Further, the hard steel layers in the protective steel plate with excellent cold roll formability according to the disclosure comprise chemical elements in percentage by mass of:

C: 0.40-0.50%, Si: 0.1-0.3%, Mn: 1.0-1.5%, Al: 0.01-0.05%, Cr: 0.1-0.3%, Ni: 0.1-0.3%, Ti: 0.01-0.03%, B: 0.001-0.003%, Mo: 0.05-0.5%, and a balance of Fe and unavoidable impurities.

In the hard steel layers of the protective steel plate with excellent cold roll formability according to the disclosure, the unavoidable impurities are mainly P, S, N elements, wherein it may be controlled that P≤0.015%, S≤0.005%, N≤0.005%.

In the above technical solution, the various chemical elements in the hard steel layers of the protective steel plate with excellent cold roll formability according to the disclosure are designed in accordance with the following principles:

C is the cheapest strengthening element in steel. However, if C is excessive, a high-temperature steel billet tends to crack in the course of cooling, which is undesirable for storage of the steel billet and increases production difficulty. Hence, the C content in the hard steel layers of the protective steel plate with excellent cold roll formability according to the disclosure is limited to 0.40-0.50%.

The Si content is controlled at 0.1-0.3%. Si has a relatively high solid solubility in steel. It's able to increase the volume fraction of ferrite in the steel, and refine grains. Hence, it facilitates increase of toughness. However, an unduly high content will degrade weldability.

Mn has a relatively strong solid strengthening effect. At the same time, it reduces the phase change temperature of steel notably, and refines the steel microstructure. It's an important element for strengthening and toughening. However, an unduly high content of Mn will increase hardenability, thereby worsening weldability and the toughness of a welding heat affected zone. Therefore, its content is controlled at 1.0-1.5%.

Al is added as a deoxygenating agent in steel making. At the same time, a trace amount of Al helps to refine grains and improve steel strength and toughness. However, excessive Al will increase ferrite brittleness in steel, leading to decreased steel toughness. Therefore, its content is controlled at 0.01-0.05%.

Cr has a solid solution strengthening effect. However, Cr is a precious alloy element. Hence, the Cr content in the hard steel layers of the protective steel plate with excellent cold roll formability according to the disclosure is limited to 0.1-0.3%.

Ni can not only increase the steel plate strength, but also improve the steel plate toughness. However, Ni is a precious alloy element. Hence, the Ni content in the hard steel layers of the protective steel plate with excellent cold roll formability according to the disclosure is limited to 0.1-0.3%.

0.01-0.03% Ti is added to mainly inhibit growth of austenite grains during reheating of a slab, while inhibiting growth of ferrite grains in recrystallization controlled rolling, thereby increasing the steel toughness.

B has good hardenability. Hence, it can increase the steel plate hardness. However, an unduly high content of B is undesirable for welding. Hence, the B content in the hard steel layers of the protective steel plate with excellent cold roll formability according to the disclosure is limited to 0.001-0.003%.

Mo has good hardenability. Hence, it can increase the steel plate hardness. However, Mo is a precious alloy element. Hence, the Mo content in the hard steel layers of the protective steel plate with excellent cold roll formability according to the disclosure is limited to 0.05-0.5%.

Further, the matrix structure of the hard steel layers of the protective steel plate with excellent cold roll formability is martensite.

Further, the hard steel layers of the protective steel plate with excellent cold roll formability has a yield strength of greater than 2000 MPa and a hardness of greater than 600 HBW.

In this technical solution, the hard steel layers of the protective steel plate with excellent cold roll formability utilize a relatively high C content, and incorporate Mo, B elements to increase hardenability. After heat treatment, the resulting matrix structure is high-strength martensite; the yield strength is greater than 2000 MPa, and the hardness is greater than 600 HBW.

Another object of the disclosure is to provide a method for manufacturing the protective steel plate with excellent cold roll formability as described above. This method can address the technical difficulties in manufacture of protective steel plates, so as to produce protective steel plates having superior properties, particularly better cold roll formability. According to this method, metallurgical bonding can be achieved at high temperatures, and interlayer bonding strength is higher. As a result, better protective effect is realized.

To achieve the above inventive object, the disclosure proposes a method for manufacturing a protective steel plate with excellent cold roll formability, comprising:

(1) assembling a hard steel layer billet and a soft steel layer billet;
(2) vacuum welding;
(3) clad rolling;
(4) post-rolling air cooling or water cooling;
(5) coiling;
(6) uncoiling, straightening and plate cutting;
(7) quenching-tempering heat treatment.

In this technical solution, due to the existence of oxide layers and greasy dirt on the bonding surfaces of the hard steel layer billets and the soft steel layer billets, it's desirable to clean the surfaces of the hard steel layer billets and the soft steel layer billets before assembled. Surface cleaning may be performed using a steel brush or sand belt, or by direct pickling, or in any other manner conceivable to a person skilled in the art.

As the protective steel plate is prone to oxidation during heating, instead of employing a process of vacuum pumping, interlayer welding is conducted directly under a vacuum state in a vacuum chamber when the welding is performed around the hard steel layer billets and the soft steel layer billets in the technical solution of the disclosure, such that the production difficulty is reduced, and the oxidation is prevented effectively.

Further, in step (1), the total thickness of the soft steel layer billets positioned at the faces accounts for 8-15% of the total thickness of the protective steel plate billets, and the thickness of the soft steel layer billet positioned in the core of the protective steel plate accounts for 10-25% of the total thickness of the protective steel plate billets.

In this technical solution, when the total thickness of the soft steel layer billets positioned at the faces accounts for 8-15% of the total thickness of the protective steel plate billets, and the thickness of the soft steel layer billet positioned in the core of the protective steel plate accounts for 10-25% of the total thickness of the protective steel plate billets, it can be ensured that the soft steel layers positioned at the faces will not crack in cold roll forming, and that the soft steel layer in the core can dissipate energy sufficiently and alter the moving direction of an invading impacting object, so as to enhance protective effect.

Further, in step (3) of the method for manufacturing a protective steel plate with excellent cold roll formability, heating is performed at a temperature in the range of 1100-1200° C., wherein a soaking time is 2-3 h, and then the clad rolling is performed with a final rolling temperature being controlled at 850-900° C.

Still further, in step (4) of the method for manufacturing a protective steel plate with excellent cold roll formability, the post-rolling air cooling or water cooling is performed to arrive at a temperature of 650-750° C.

In this technical solution, the use of water cooling or air cooling after the rolling depends on the thickness of the final product. Generally, air cooling may be employed for a thin steel plate. Subsequently, when water or air cooled to 650-750° C., the protective steel clad plate is uncoiled, straightened and cut.

Further, in the quenching substep in step (7) of the method for manufacturing a protective steel plate with excellent cold roll formability, the quenching temperature is at least 50° C. above the Ac3 temperature of the hard steel layers; the soaking time is at least 3 min/mm×the clad steel plate thickness in mm; and then the plate is cooled to room temperature at a rate of ≥50° C./s.

The reason for controlling the quenching temperature to be at least 50° C. above the Ac3 temperature of the hard steel layers, the soaking time to be at least 3 min/mm×the clad steel plate thickness in mm, and then cooling the plate to room temperature at a rate of ≥50° C./s is that austenization of the structure in the steel matrix which begins at a temperature of the Ac3 temperature or higher, and the higher above the Ac3 temperature, the driving force for austenization is greater, so that austenization is faster, and the soaking time is shorter. However, if the heating temperature for quenching is too high, energy consumption will be increased, leading to increased production cost. Therefore, the quenching temperature is specified to be 50° C. higher than the Ac3 temperature, and the soaking time is 3 times the steel plate thickness.

Still further, in the tempering substep in step (7) of the method for manufacturing a protective steel plate with excellent cold roll formability, the tempering temperature is 150-230° C., and the soaking time is 15-60 min.

The protective steel plate with excellent cold roll formability according to the disclosure is tempered at a temperature in the range of 150-230° C. to relieve or eliminate quenching stress, so as to improve the toughness of the protective steel plate with excellent cold roll formability.

The protective steel plate with excellent cold roll formability according to the disclosure has the following beneficial effects:

(1) The protective steel plate according to the disclosure is designed to have alternating soft and hard steel layers, wherein the soft steel layers acting as face layers have good plastic deformability, and do no crack in cold roll forming; the intermediate hard steel layers deform, crack or even break away when impacted by an impacting object, and the deformation energy, the crack forming and propagation energy, the interlayer binding energy released when the hard steel layers break away from the soft steel layer positioned in the core, and the kinetic energy of leaving fragments are fully absorbed, thereby consuming a part of the kinetic energy of the impacting object, such that the impacting object is no longer able to move forward; and the soft steel layer in the core has good plasticity and deformability, so as to alter the moving direction of the impacting object. The soft steel layer in the core also increases the penetration thickness of the impacting object, thereby further alleviating the damage caused by the impacting object.

(2) The protective steel plate according to the disclosure is processed by hot clad rolling, wherein metallurgical bonding between the metal layers is achieved at a high temperature, so the interlayer bonding is very strong, and delamination is less likely to occur.

(3) The protective steel plate according to the disclosure is designed to have alternating soft and hard layers, such that the plasticity of the steel plate is improved, and the steel plate acquires better cold roll formability, thereby widening the application field of the protective steel plate.

(4) In a preferred embodiment of the disclosure, the total thickness of the soft steel layer billets positioned at the faces accounts for 8-15% of the total thickness of the protective steel plate billets, and the thickness of the soft steel layer billet positioned in the core of the protective steel plate accounts for 10-25% of the total thickness of the protective steel plate billets, such that the protective steel plate has good plastic deformability to resist cracking in cold roll forming on the one hand, and on the other hand, it can be ensured that when an impacting object is invading, the impacting object should be redirected, so as to lower the damaging capability and dangerousness of the impacting object, and enhance the protecting capability of the protective steel plate.

(5) The manufacture method of the disclosure adopts a vacuum welding process, exempting a vacuum pumping step conventionally following welding, so that a better sealing effect is achieved.

(6) After assembly, the manufacture method of the disclosure adopts a conventional rolling process like that for a common steel billet, so that the production difficulty is reduced, and the compatibility of this manufacture process is improved.

It's to be understood that, in some preferred embodiments, the impacting object herein is a bullet or a pill. In some embodiments, the protective effect or protecting capability herein is bullet-proof effect or bullet-proof capability. In some preferred embodiments, the protective steel plate herein is a bullet-proof steel plate.

DETAILED DESCRIPTION

The protective steel plate with excellent cold roll formability and the manufacture method thereof according to the disclosure will be further explained and illustrated with reference to the accompanying drawings and the specific examples. Nonetheless, the explanation and illustration are not intended to unduly limit the technical solution of the disclosure.

Figure 1:
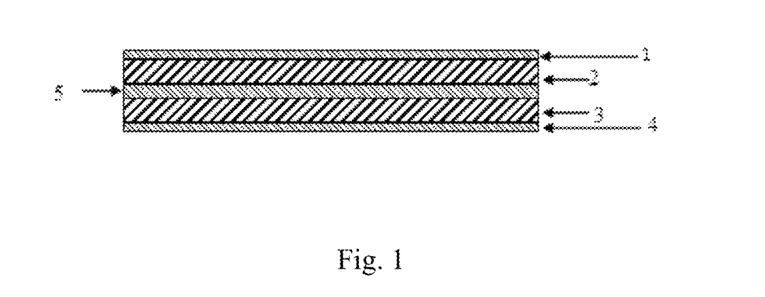
FIG. 1 is a schematic view showing a structure of a protective steel plate according to the disclosure.

As shown by FIG. 1, the protective steel plate of the disclosure is a five-layer structure having three soft steel layers and two hard steel layers, wherein the reference numbers 2 and 3 indicate the hard steel layers, the reference numbers 1 and 4 indicate the soft steel layers positioned at the faces, and the reference number S indicates the soft steel layer positioned in the core.

Table 1 lists the mass percentages of the chemical elements in Examples A1-A6 of the protective steel plate with excellent cold roll formability.

TABLE 1

(wt %, the balance is Fe and other unavoidable impurities except for P, S and N)

| Ex. | Steel billet | C | Si | Mn | P | S | Al | N | Ti | Cr | Ni | Mo | B |
|---|---|---|---|---|---|---|---|---|---|---|---|---|---|
| A1 | Hard layer steel | 0.40 | 0.25 | 1.0 | 0.004 | 0.004 | 0.029 | 0.0019 | 0.025 | 0.25 | 0.10 | 0.15 | 0.002 |
|    | Soft layer steel | 0.005 | 0.003 | 0.07 | 0.004 | 0.006 | 0.001 | 0.0028 | 0.036 | — | — | — | — |
| A2 | Hard layer steel | 0.41 | 0.15 | 1.1 | 0.008 | 0.004 | 0.032 | 0.0029 | 0.030 | 0.15 | 0.10 | 0.10 | 0.002 |
|    | Soft layer steel | 0.002 | 0.005 | 0.12 | 0.006 | 0.003 | 0.003 | 0.0022 | 0.028 | — | — | — | — |

TABLE 1-continued (wt %, the balance is Fe and other unavoidable impurities except for P, S and N)

| Ex. | Steel billet | C | Si | Mn | P | S | Al | N | Ti | Cr | Ni | Mo | B |
|---|---|---|---|---|---|---|---|---|---|---|---|---|---|
| A3 | Hard layer steel | 0.44 | 0.25 | 1.3 | 0.004 | 0.004 | 0.049 | 0.0019 | 0.025 | 0.25 | 0.20 | 0.35 | 0.0022 |
|  | Soft layer steel | 0.005 | 0.003 | 0.06 | 0.004 | 0.003 | 0.001 | 0.0028 | 0.036 | — | — | — | — |
| A4 | Hard layer steel | 0.46 | 0.15 | 1.1 | 0.008 | 0.004 | 0.032 | 0.0029 | 0.030 | 0.15 | 0.24 | 0.30 | 0.0014 |
|  | Soft layer steel | 0.002 | 0.005 | 0.12 | 0.006 | 0.003 | 0.003 | 0.0022 | 0.028 | — | — | — | — |
| A5 | Hard layer steel | 0.49 | 0.25 | 1.3 | 0.004 | 0.004 | 0.029 | 0.0019 | 0.030 | 0.25 | 0.30 | 0.45 | 0.0025 |
|  | Soft layer steel | 0.005 | 0.003 | 0.07 | 0.004 | 0.006 | 0.001 | 0.0028 | 0.036 | — | — | — | — |
| A6 | Hard layer steel | 0.48 | 0.15 | 1.1 | 0.008 | 0.002 | 0.032 | 0.0029 | 0.030 | 0.27 | 0.29 | 0.48 | 0.002 |
|  | Soft layer steel | 0.004 | 0.005 | 0.08 | 0.006 | 0.003 | 0.003 | 0.0022 | 0.028 | — | — | — | — |

The protective steel plates with excellent cold roll formability in the above Examples were obtained by the following steps:

(1) The compositions listed in Table 1 were smelted and cast to form hard steel layer billets and soft steel layer billets;

(2) The hard steel layer billets and the soft steel layer billets were assembled;

(3) Vacuum welding was performed in a vacuum chamber;

(4) Clad rolling was performed, wherein heating was performed at 1100-1200° C., soaking was performed for 2-3 h, and then clad rolling was performed with a final rolling temperature being controlled at 850-900° C.;

(5) post-rolling air cooling or water cooling to 650-750° C. was performed;

(6) coiling was performed at a temperature of 650-750° C.;

(7) uncoiling, straightening and plate cutting were performed;

(8) quenching-tempering treatment was performed, wherein the quenching temperature was at least 50° C. above the Ac3 temperature of the hard steel layer, the soaking time was at least 3 mm/min×the clad steel plate thickness in mm, and then the plate was cooled to room temperature at a rate of ≥50° C./s; the tempering temperature was 150-230° C., and the temperature was held for 15-60 min.

Table 2 lists the thicknesses and sandwich designs of the hard steel layers and soft steel layers assembled in Examples A1-A6 of the protective steel plate with excellent cold roll formability.

TABLE 2

| Ex. | Steel billet | Steel billet thickness/mm | Percentage of steel layer thickness over total assembly thickness | Final product thickness/mm |
|---|---|---|---|---|
| A1 | Soft steel layers at the faces | 12.5 + 12.5 | 10% | 3 |
|  | Hard steel layers | 100 + 100 | 80% |  |
|  | Soft steel layer in the core | 25 | 10% |  |
| A2 | Soft steel layers at the faces | 10 + 10 | 8% | 3 |
|  | Hard steel layers | 100 + 100 | 80% |  |
|  | Soft steel layer in the core | 30 | 12% |  |
| A3 | Soft steel layers at the faces | 15 + 15 | 10.3% | 6 |
|  | Hard steel layers | 100 + 100 | 69% |  |
|  | Soft steel layer in the core | 60 | 20.7% |  |
| A4 | Soft steel layers at the faces | 20 + 20 | 14.3% | 6 |
|  | Hard steel layers | 95 + 95 | 67.9% |  |
|  | Soft steel layer in the core | 50 | 17.8% |  |
| A5 | Soft steel layers at the faces | 15 + 15 | 10% | 12 |
|  | Hard steel layers | 115 + 115 | 76.7% |  |
|  | Soft steel layer in the core | 40 | 13.3% |  |
| A6 | Soft steel layers at the faces | 20 + 20 | 13.3% | 12 |
|  | Hard steel layers | 105 + 105 | 70% |  |
|  | Soft steel layer in the core | 50 | 16.7% |  |

As shown by Table 2, in Examples A1-A6, the total thickness of the soft steel layer billets positioned at the faces accounts for 8-15% of the total thickness of the protective steel plate billets, and the thickness of the soft steel layer billet positioned in the core of the protective steel plate accounts for 10-25% of the total thickness of the protective steel plate billets. The final products of the protective steel plate have a thickness in the range of 2-20 mm. Such a design ensures that the soft steel layers positioned at the faces will not crack in cold roll forming, and the soft steel layer in the core should be fully effective in dissipating energy and altering the moving direction of an invading impacting object, so as to improve the protective effect and meet the requirements of protective steel plates of various specifications in application.

Table 3 lists the process parameters of the manufacture method in Examples A1-A6 of the protective steel plate with excellent cold roll formability.

TABLE 3

| | Step (4) | | | Step (5) | | | Step (6) | | Step (8) | | | |
|---|---|---|---|---|---|---|---|---|---|---|---|---|
| | | | | | Post-rolling | Final | | | | | | |
| | Heating | | Final rolling | | cooling | product | Cooling | Coiling | | Quenching | Soaking time in | Tempering | Soaking time in |
| | temperature | Soaking time | temperature | Cooling | temperature | thickness | rate | temperature | Ac3 | temperature | quenching | temperature | tempering |
| Ex. | (° C.) | (h) | (° C.) | mode | (° C.) | (mm) | (° C./s) | (° C.) | (° C.) | (° C.) | (min) | (° C.) | (min) |
| A1 | 1120 | 2 | 880 | Air cooling | 680 | 3 | 80 | 720 | 796 | 850 | 15 | 180 | 20 |
| A2 | 1150 | 2 | 900 | Water cooling | 650 | 3 | 80 | 720 | 788 | 850 | 12 | 160 | 20 |
| A3 | 1100 | 2.4 | 850 | Water cooling | 700 | 6 | 60 | 680 | 795 | 860 | 20 | 180 | 25 |
| A4 | 1180 | 2.4 | 860 | Water cooling | 720 | 6 | 60 | 680 | 785 | 860 | 20 | 210 | 25 |
| A5 | 1190 | 2.8 | 870 | Water cooling | 740 | 12 | 50 | 650 | 789 | 880 | 30 | 230 | 40 |
| A6 | 1200 | 2.8 | 890 | Water cooling | 750 | 12 | 50 | 650 | 787 | 880 | 30 | 230 | 40 |

The mechanical properties of the hard steel layers and soft steel layers in Examples A1-A6 of the protective steel plate with excellent cold roll formability were also measured according to the disclosure. Table 4 lists the mechanical properties of the hard steel layers and soft steel layers in Examples A1-A6.

TABLE 4

| Ex. | Steel billet | Hardness | Yield strength (MPa) | Tensile strength (MPa) | Elongation rate | Transverse cold roll forming of clad steel plate d = 1a, 180° |
|---|---|---|---|---|---|---|
| A1 | Hard steel layers | 648 HBW | 2160 | — | — | Pass |
| | Soft steel layers positioned at the faces | 99 Hv | 169 | 314 | 45.5 | |
| | Soft steel layer positioned at the core | 78 Hv | 133 | 244 | 60.0 | |
| A2 | Hard steel layers | 645 HBW | 1175 | — | — | Pass |
| | Soft steel layers positioned at the faces | 95 Hv | 168 | 293 | 45.5 | |
| | Soft steel layer positioned at the core | 80 Hv | 132 | 248 | 56.5 | |
| A3 | Hard steel layers | 638 HBW | 2100 | — | — | Pass |
| | Soft steel layers positioned at the faces | 95 Hv | 167 | 292 | 45.5 | |
| | Soft steel layer positioned at the core | 80 Hv | 131 | 241 | 53.0 | |
| A4 | Hard steel layers | 636 HBW | 2084 | — | — | Pass |
| | Soft steel layers positioned at the faces | 98 Hv | 200 | 305 | 48.0 | |
| | Soft steel layer positioned at the core | 81 Hv | 146 | 251 | 53.5 | |
| A5 | Hard steel layers | 624 HBW | 2056 | — | — | Pass |
| | Soft steel layers positioned at the faces | 98 Hv | 197 | 303 | 46.5 | |
| | Soft steel layer positioned at the core | 81 Hv | 145 | 250 | 55.0 | |
| A6 | Hard steel layers | 626 HBW | 2070 | — | — | Pass |
| | Soft steel layers positioned at the faces | 97 Hv | 203 | 306 | 49.5 | |
| | Soft steel layer positioned at the core | 80 Hv | 146 | 251 | 52.0 | |

As shown by Table 4, the hard steel layers in Examples A1-A6 have a yield strength of greater than 2000 MPa and a hardness of greater than 600 HBW. On the other hand, because a design featuring extremely low carbon and alloy is employed in the soft steel layers positioned at the faces and the soft steel layer positioned in the core, the hardness of the soft steel layer positioned in the core and the hardness of the soft steel layers positioned at the faces do not exceed 90 Hv and 100 Hv respectively, while the elongation rate is greater than 40%, so that they have good plasticity, particularly suitable for cold roll forming.

Figure 2:
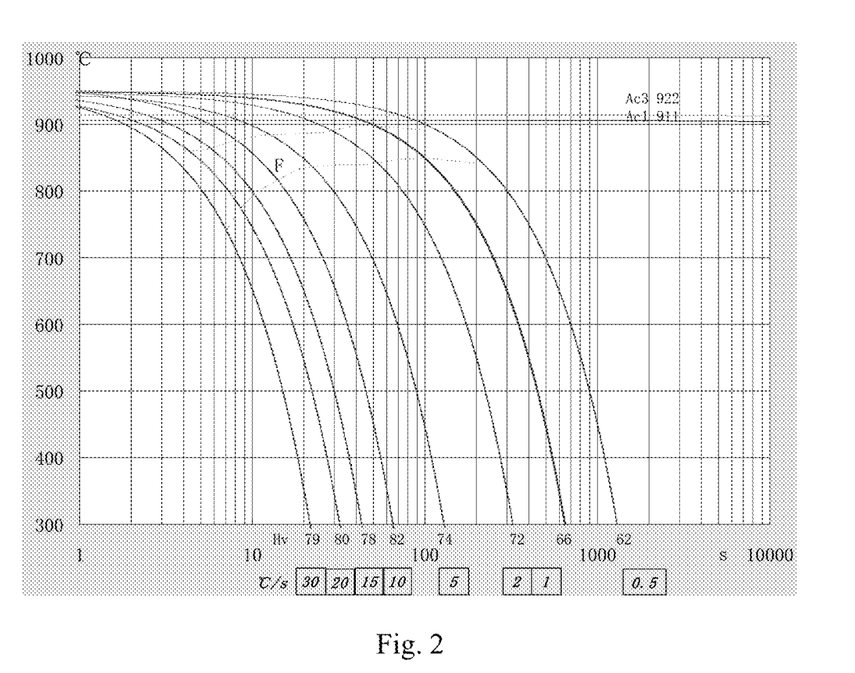
FIG. 2 shows CCT curves (continuous cooling transformation curves) of soft steel layers for the protective steel plate with excellent cold roll formability according to the disclosure.

FIG. 2 shows CCT curves of soft steel layers for the protective steel plate with excellent cold roll formability according to the disclosure. By analysis of these curves, it can be determined that equiaxed ferrite is formed in the soft steel layers in a quenched state.

Figure 3:
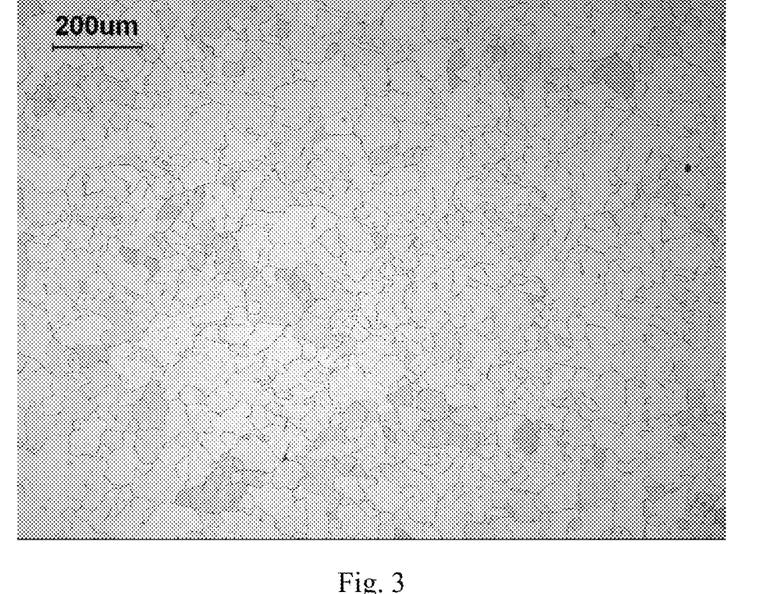
FIG. 3 is an image showing a metallographic structure of a soft steel layer positioned in a core according to Example A1.
Figure 4:
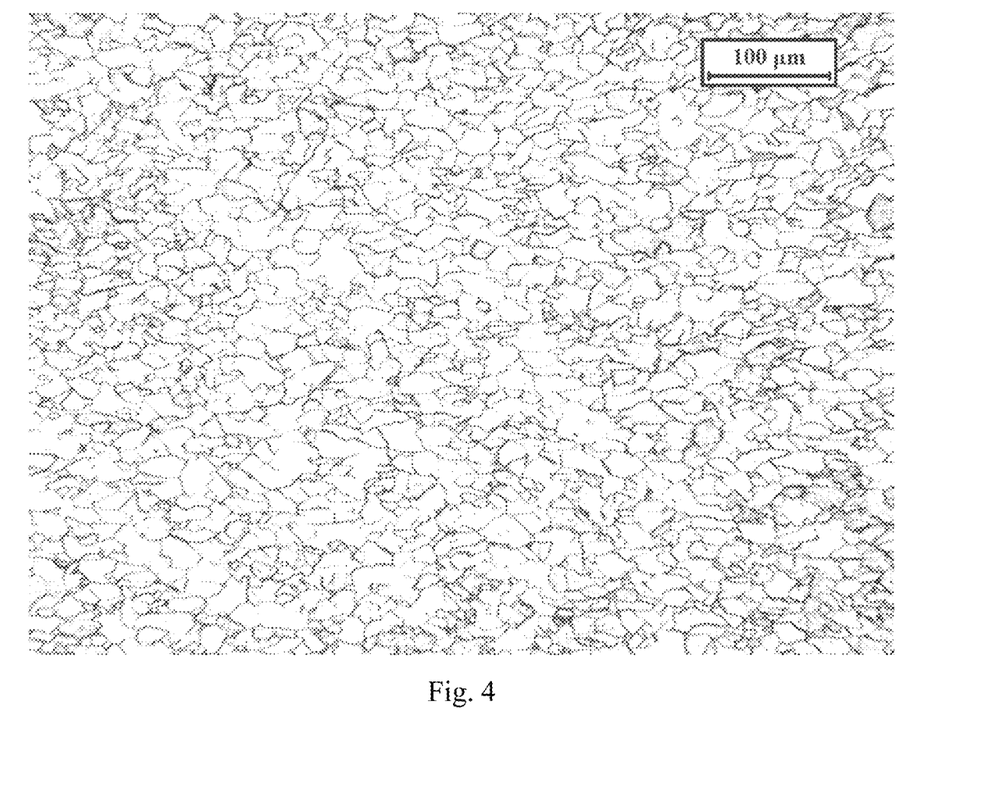
FIG. 4 is an image showing a metallographic structure of a soft steel layer positioned at a face according to Example A1.

FIGS. 3 and 4 show respectively the matrix structures of the soft steel layer positioned in the core and the soft steel layers positioned at the faces in Example A1. As can be seen from FIGS. 3 and 4, the main structures are equiaxed ferrite.

Figure 5:
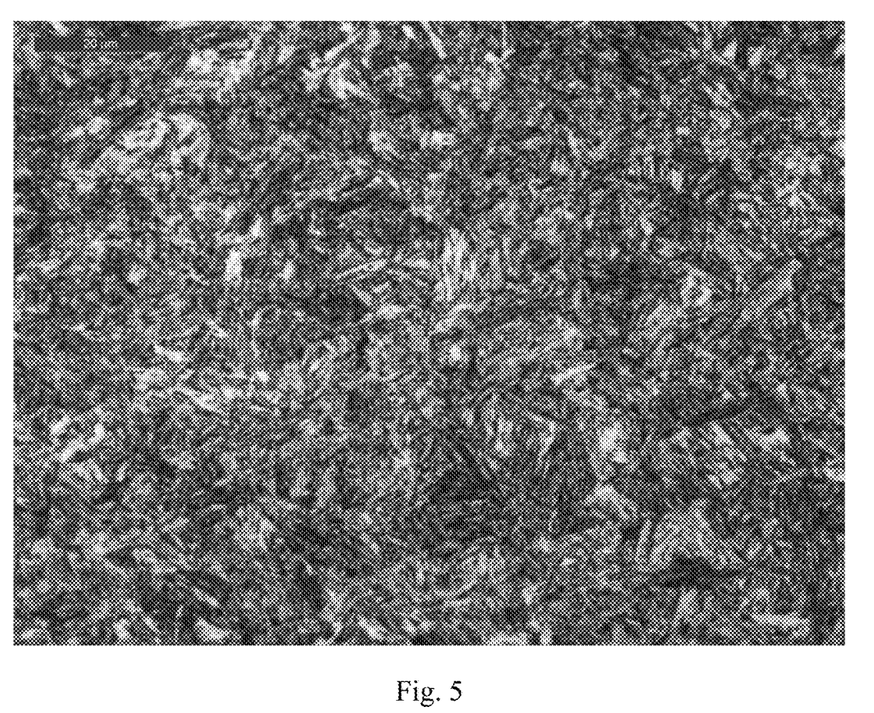
FIG. 5 is an image showing a metallographic structure of a hard steel layer according to Example A1.

FIG. 5 shows the matrix structure of the hard steel layers in Example A1. As can be seen from FIG. 5, its matrix structure is mainly martensite.

Figure 6:
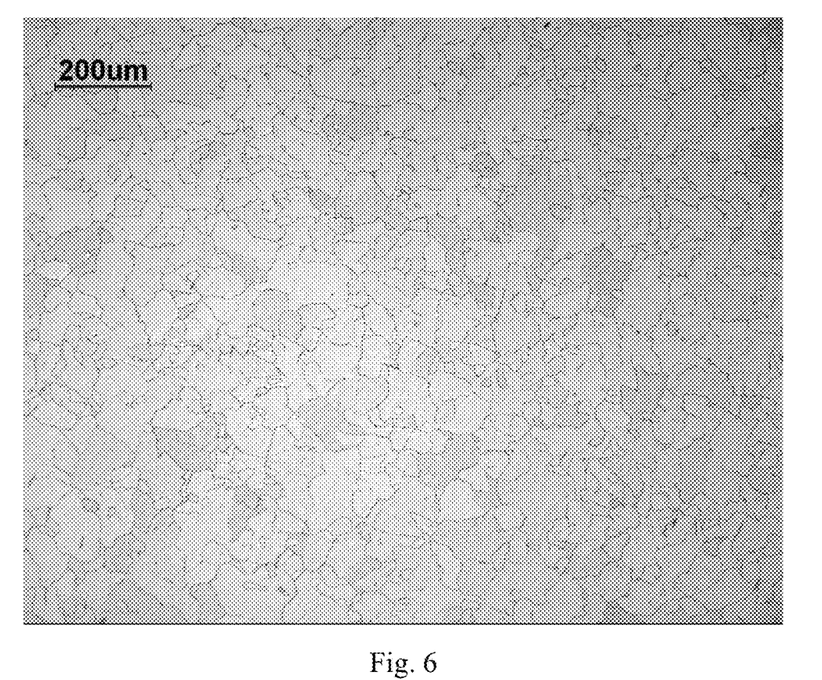
FIG. 6 is an image showing a metallographic structure of a soft steel layer positioned in a core according to Example A2.
Figure 7:
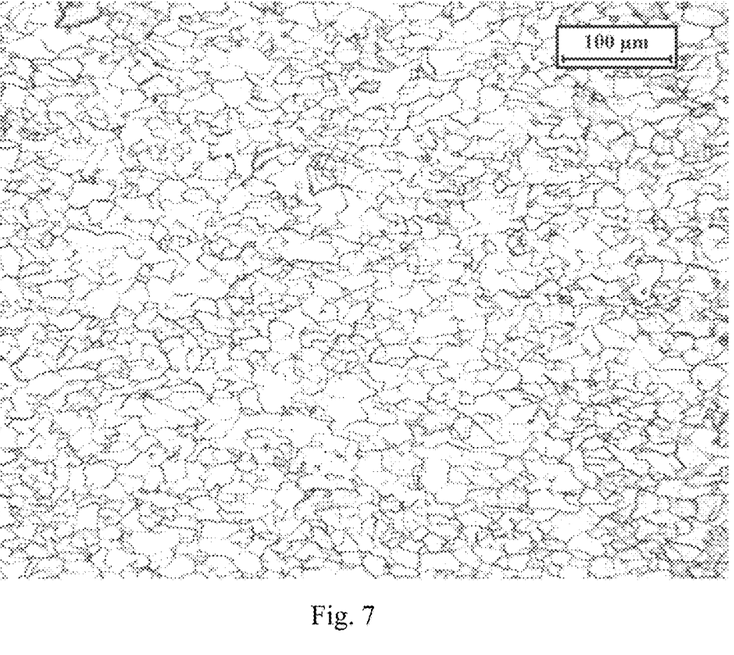
FIG. 7 is an image showing a metallographic structure of a soft steel layer positioned at a face according to Example A2.

FIGS. 6 and 7 show respectively the matrix structures of the soft steel layer positioned in the core and the soft steel layers positioned at the faces in Example A2. As can be seen from FIGS. 6 and 7, the main structures are equiaxed ferrite.

Figure 8:
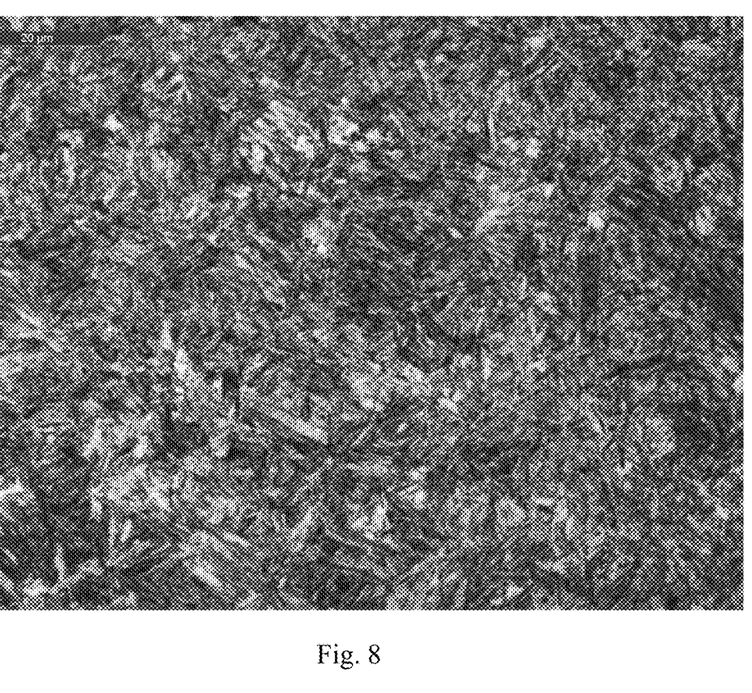
FIG. 8 is an image showing a metallographic structure of a hard steel layer according to Example A2.

FIG. 8 shows the matrix structure of the hard steel layers in Example A2. As can be seen from FIG. 8, its matrix structure is mainly martensite.

It is to be noted that there are listed above only specific examples of the invention. Obviously, the invention is not limited to the above examples. Instead, there exist many similar variations. All variations derived or envisioned directly from the disclosure of the invention by those skilled in the art should be all included in the protection scope of the invention.

What is claimed is:

1. A protective steel plate with cold roll formability, comprising: three soft steel layers and two hard steel layers, wherein the three soft steel layers and the two hard steel layers are positioned alternately, and face layers of the protective steel plate are soft steel layers, wherein the hard steel layers and the soft steel layers are atomically bonded by rolling cladding; wherein the protective steel plate can pass transverse cold roll forming of clad steel plate d=1a, 180°, wherein the soft steel layers have a hardness value of less than 110 Hv, and the hard steel layers have a hardness of greater than 600 HBW; wherein the soft steel layers consist of chemical elements in percentage by mass of:
   C: 0.001-0.01%, 0<Si≤0.005%, Mn: 0.05-0.15%, 0<Al≤0.005%, Ti: 0.01-0.10%, with a balance of Fe and unavoidable impurities, and wherein the hard steel layers consist of chemical elements in percentages by mass of:
   C: 0.40-0.50%, Si: 0.1-0.3%, Mn: 1.0-1.5%, Al: 0.01-0.05%, Cr: 0.1-0.3%, Ni: 0.1-0.3%, Ti: 0.01-0.03%, B: 0.001-0.003%, Mo: 0.1-0.5%, and a balance of Fe and unavoidable impurities, and
   wherein the protective steel plate has a thickness of 3-20 mm.

2. The protective steel plate according to claim 1, wherein the soft steel layers have a matrix structure of equiaxed ferrite.

3. The protective steel plate according to claim 2, wherein the equiaxed ferrite has a grain size of 30-120 μm.

4. The protective steel plate according to claim 3, wherein the soft steel layers have a yield strength of 80-180 MPa and an elongation rate of greater than 40%.

5. The protective steel plate according to claim 4, wherein the soft steel layer positioned in a core has a hardness value of less than 90 Hv, and the soft steel layers positioned at the face layers have a hardness value of less than 110 Hv.

6. The protective steel plate according to claim 1, wherein the hard steel layers have a matrix structure of martensite.

7. The protective steel plate according to claim 6, wherein the hard steel layers have a yield strength of greater than 2000 MPa.

8. A manufacture method for the protective steel plate according to claim 1, comprising steps:
   (1) assembling hard steel layer billets and soft steel layer billets;
   (2) vacuum welding;
   (3) clad rolling;
   (4) post-rolling air cooling or water cooling;
   (5) coiling;
   (6) uncoiling, straightening and plate cutting;
   (7) quenching-tempering heat treatment.

9. The manufacture method for the protective steel plate according to claim 8, wherein in step (1), the soft steel layer billets positioned at face layers have a total thickness accounting for 8-15% of a total thickness of the protective steel plate billets, and the soft steel layer billet positioned in a core has a thickness accounting for 10-25% of the total thickness of the protective steel plate billets.

10. The manufacture method for the protective steel plate according to claim 8, wherein in step (3), heating is performed at a temperature in the range of 1100-1200° C., wherein the temperature is held for 2-3 h, and then the clad rolling is performed with a final rolling temperature being controlled at 850-900° C.

11. The manufacture method for the protective steel plate according to claim 8, wherein in step (4), the post-rolling air cooling or water cooling is performed to arrive at 650-750° C.

12. The manufacture method for the protective steel plate according to claim 8, wherein in a quenching substep in step (7), a quenching temperature is at least 50° C. above an Ac3 temperature of the hard steel layers; a soaking time is at least 3 min/mm×a clad steel plate thickness in mm; and then the plate is cooled to room temperature at a rate of 50° C./s.

13. The manufacture method for the protective steel plate according to claim 8, wherein in a tempering substep in step (7), a tempering temperature is 150-230° C., and the temperature is held for 15-60 min.

14. The manufacture method for the protective steel plate according to claim 12, wherein in a tempering substep in step (7), a tempering temperature is 150-230° C., and the temperature is held for 15-60 min.

* * * * *